(12) United States Patent
Morimoto (10) Patent No.: US 9,686,439 B2
(45) Date of Patent: Jun. 20, 2017

(54) TRANSMISSION DEVICE, TRANSMISSION METHOD AND PROGRAM

(75) Inventor: Naoki Morimoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/053,505

(22) Filed: Mar. 22, 2011

(65) Prior Publication Data

US 2011/0246545 A1    Oct. 6, 2011

(30) Foreign Application Priority Data

Mar. 30, 2010    (JP) ................................. 2010-079180

(51) Int. Cl.
*G06F 17/30* (2006.01)
*H04N 1/40* (2006.01)

(52) U.S. Cl.
CPC .............................. *H04N 1/40068* (2013.01)

(58) Field of Classification Search
USPC ........................................................ 707/822
See application file for complete search history.

(56) References Cited

U.S. PATENT DOCUMENTS

| 6,034,785 | A * | 3/2000 | Itoh ........................ G06K 15/00 358/1.18 |
| 6,310,647 | B1 * | 10/2001 | Parulski et al. ......... 348/231.99 |
| 2002/0030746 | A1 * | 3/2002 | Shibutani ........... H04N 1/00347 348/207.99 |
| 2002/0044157 | A1 * | 4/2002 | Wolf .................. H04N 1/00236 715/700 |
| 2002/0196882 | A1 * | 12/2002 | Wang ..................... H04L 29/06 375/355 |
| 2004/0096002 | A1 * | 5/2004 | Zdepski ................ H04N 19/70 375/240.26 |

(Continued)

FOREIGN PATENT DOCUMENTS

| CN | 1389060 A | 1/2003 |
| CN | 1855990 A | 11/2006 |

(Continued)

OTHER PUBLICATIONS

CIPA DC-007—Translation—2009, Multi-Picture Format, established on Feb. 4, 2009, published by Camera & Imaging Products Association (CIPA), pp. 1-61.*

(Continued)

*Primary Examiner* — Hosain Alam
*Assistant Examiner* — Ahmed Abraham
(74) *Attorney, Agent, or Firm* — Oblon, McClelland, Maier & Neustadt, L.L.P.

(57) ABSTRACT

A transmission device includes: a file processing means for performing processing with respect to a file to be transmitted to a receiving device; and a transmission means for transmitting the file to the receiving device, wherein the file has a data structure storing an original image, one or plural images for transmission different from the original image and attribute information concerning attributes of these images, and the file processing means generates a file having a data structure storing the image for transmission and the attribute information obtained by adding common attributes added to the original image to unique attributes added to the image for transmission.

16 Claims, 7 Drawing Sheets

(56) References Cited

U.S. PATENT DOCUMENTS

| | | | | |
|---|---|---|---|---|
| 2007/0081189 A1* | 4/2007 | Kamei | ............... | G06F 21/6209 |
| | | | | 358/1.18 |
| 2007/0118651 A1* | 5/2007 | Giampaolo et al. | .......... | 709/225 |
| 2007/0196075 A1* | 8/2007 | Yanagita | .............. | G11B 27/032 |
| | | | | 386/241 |
| 2009/0106674 A1* | 4/2009 | Bray et al. | .................... | 715/762 |
| 2009/0110313 A1* | 4/2009 | Sakaue | ............... | H04N 1/32101 |
| | | | | 382/243 |
| 2010/0303364 A1* | 12/2010 | Yamada | ............... | H04N 17/004 |
| | | | | 382/201 |
| 2012/0039396 A1* | 2/2012 | Ihara | .................... | H04N 21/236 |
| | | | | 375/240.25 |

FOREIGN PATENT DOCUMENTS

| | | |
|---|---|---|
| JP | 2001-43154 | 2/2001 |
| JP | 2009-135908 A | 6/2009 |
| JP | 2009-212834 A | 9/2009 |
| JP | 2009-267946 A | 11/2009 |
| WO | WO 02/41629 A1 | 5/2002 |
| WO | WO 2009/066471 A1 | 5/2009 |

OTHER PUBLICATIONS

Office Action issued Apr. 1, 2014 in Japanese Patent Application No. 2010-079180.

Combined Chinese Office Action and Search Report issued Jun. 26, 2014 in Patent Application No. 201110070019.X (with English language translation).

Office Action issued Jan. 23, 2014 in Japanese Patent Application No. 2010-079180.

Office Action issued Feb. 13, 2015, in Chinese Patent Application No. 201110070019.X (with English-language Translation).

Multi-Picture Format, CIPA DC-007—Translation—2009, Standardization Committee, Camera & Imaging Products Association, pp. 9-11, 16 and 30, Feb. 4, 2009 (with Cover Page).

\* cited by examiner

| TAG NAMES | TAG NUMBER | | BASELINE MP FILE | EXTENDED MP FILE | |
|---|---|---|---|---|---|
| | Dec | Hex | MONITOR DISPLAY IMAGE | IMAGES OTHER THAN MONITOR DISPLAY IMAGE | MONITOR DISPLAY IMAGE |
| IMAGE WIDTH | 256 | 100 | × | | × |
| IMAGE LENGTH | 257 | 101 | × | | × |
| DEPTH OF BITS IN IMAGE | 258 | 102 | × | | × |
| COMPRESSION TYPE | 259 | 103 | × | | × |
| PIXEL STRUCTURE | 262 | 106 | × | | × |
| IMAGE TITLE | 270 | 10E | × | | × |
| MANUFACTURER NAME OF IMAGE INPUT DEVICE | 271 | 10F | × | | × |
| MODEL NAME OF IMAGE INPUT DEVICE | 272 | 110 | × | | × |
| LOCATION OF IMAGE DATA | 273 | 111 | × | | × |
| IMAGE ORIENTATION | 274 | 112 | × | | × |
| NUMBER OF COMPONENTS | 277 | 115 | × | | × |
| NUMBER OF ROWS PER ONE STRIP | 278 | 116 | × | | × |
| TOTAL NUMBER OF BYTES OF STRIP | 279 | 117 | × | | × |
| RESOLUTION IN IMAGE WIDTH | 282 | 11A | ● | | ● |
| RESOLUTION IN IMAGE HEIGHT | 283 | 11B | ● | SAME AS EXIF 2.21 | ● |
| LINE OF IMAGE DATA | 284 | 11C | × | | × |
| UNIT OF RESOLUTIONS IN IMAGE WIDTH AND IMAGE HEIGHT | 296 | 128 | ● | | ● |
| REPRODUCTION TONE CURVE CHARACTERISTICS | 301 | 12D | × | | × |
| USED SOFTWARE NAME | 305 | 131 | × | | × |
| FILE CHANGE DATE AND TIME | 306 | 132 | × | | × |
| ARTIST | 315 | 13B | × | | × |
| COLOR COORDINATE VALUES OF REFERENCE WHITE POINT | 318 | 13E | × | | × |
| COLOR COORDINATE VALUES OF PRIMARY COLOR | 319 | 13F | × | | × |
| OFFSET OF JPEG TO SOI | 513 | 201 | × | | × |
| NUMBER OF BYTES OF JPEG DATA | 514 | 202 | × | | × |
| COLOR CONVERSION MATRIX COEFFICIENTS | 529 | 211 | × | | × |
| PIXEL CONFIGURATION OF YCC (THINNING-OUT RATE OF C) | 530 | 212 | × | | × |
| PIXEL CONFIGURATION OF YCC (POSITIONS OF Y AND C) | 531 | 213 | × | | × |
| REFERENCE BLACK POINT VALUE AND REFERENCE WHITE POINT VALUE | 532 | 214 | × | | × |
| IMAGING COPYRIGHT HOLDER/EDITION COPYRIGHT HOLDER | 33432 | 8298 | × | | × |
| EXIF TAG | 34686 | 8769 | ■ | | ■ |
| GPS TAG | 34853 | 8825 | × | | × |

FIG. 6

| ASPECT RATIO OF MONITOR ORIGINAL IMAGE (TYPICAL EXAMPLE) | MONITOR DISPLAY IMAGE | |
|---|---|---|
| | CLASS 1 | CLASS 2 |
| 4:3 | 640 PIXELS × 480 PIXELS | 1440 PIXELS × 1080 PIXELS |
| 16:9 | 640 PIXELS × 360 PIXELS | 1920 PIXELS × 1080 PIXELS |

TRANSMISSION DEVICE, TRANSMISSION METHOD AND PROGRAM

BACKGROUND OF THE INVENTION

1. Field of the Invention

The present invention relates to a transmission device, a transmission method and a program, and particularly relates to a transmission device, a transmission method and a program capable of reducing the processing load at the time of transmitting images for transmission.

2. Description of the Related Art

In related art, images for transmission obtained by processing original images stored in a transmission source apparatus are commonly transmitted to a transmission destination apparatus.

As a technique for transmitting images for transmission as described above, for example, JP-A-2001-43154 (Patent Document 1) is known. In Patent Document 1, ability information of the transmission destination apparatus is acquired and image data compressed in accordance with the ability information is transmitted to the transmission destination apparatus to prevent standard violation of images for transmission.

SUMMARY OF THE INVENTION

However, in the technique described in Patent Document 1, image data is compressed in accordance with the ability information of the transmission destination apparatus, then, the compressed data is transmitted. Therefore, there is a problem that the processing load at the time of data transmission is increased.

In view of the above, it is desirable to reduce the processing load at the time of transmitting images for transmission.

According to an embodiment of the invention, there is provided a transmission device including a file processing means for performing processing with respect to a file to be transmitted to a receiving device and a transmission means for transmitting the file to the receiving device, in which the file has a data structure storing an original image, one or plural images for transmission different from the original image and attribute information concerning attributes of these images, and the file processing means generates a file having a data structure storing the image for transmission and the attribute information obtained by adding common attributes added to the original image to unique attributes added to the image for transmission.

The receiving device includes a display unit, and the image for transmission is a display image to be displayed on the display unit which is the same image as the original image and different resolution. The file processing means includes a cutting means for cutting the display image stored in the file and an addition means for adding the common attributes added to the original image to the unique attributes added to the cut display image.

The file further store attached information for associating the original image with one or plural display images, and the cutting means cuts the display image based on the attached information stored in the file.

The transmission device further includes a determination means for determining whether the resolution of one or plural display images corresponds to display ability of the display unit when transmission of the file to the receiving device is instructed, in which the cutting means cuts the display image having the resolution corresponding to the display ability when it is determined that the resolution of the display image corresponds to the display ability of the display unit.

The addition means adds only fundamental particular attributes for displaying the display image in the common attributes with respect to the unique attributes.

The addition means adds all common attributes to the unique attributes.

The file is a file defined by a multi picture format, and the attributes are Exif tags defined by an Exif (Exchangeable Image File Format) standard.

The unique attributes include at least information indicating resolutions in width and height of the display image and the unit of the resolutions.

The transmission device may be an independent device as well as an internal block included in one device.

According to another embodiment of the invention, there is provided a transmission method including the steps of: performing processing with respect to a file to be transmitted to a receiving device and transmitting the file to the receiving device by a transmission device, in which the file has a data structure storing an original image, one or plural images for transmission different from the original image and attribute information concerning attributes of these images, and a file having a data structure storing the image for transmission and the attribute information obtained by adding common attributes added to the original image to unique attributes added to the image for transmission is generated in the processing.

According to still another embodiment of the invention, there is provided a program allowing a computer to perform processing with respect to a file to be transmitted to a receiving device, and to transmit the file to the receiving device, in which the file has a data structure storing an original image, one or plural images for transmission different from the original image and attribute information concerning attributes of these images, and a file having a data structure storing the image for transmission and the attribute information obtained by adding common attributes added to the original image to unique attributes added to the image for transmission is generated.

According to the embodiment of the invention, the file to be transmitted to the receiving device has the data structure storing the original image, one or plural images for transmission different from the original image and attribute information concerning attributes of these images, and the file having the data structure storing the image for transmission and attribute information obtained by adding common attributes added to the original image to unique attributes added to the image for transmission is generated.

As described above, it is possible to reduce the processing load at the time of transmitting images for transmission according to the embodiment of the invention.

DESCRIPTION OF THE PREFERRED EMBODIMENTS

Hereinafter, an embodiment of the invention will be explained with reference to the drawings.

[Outline of Transmission Processing of Images for Transmission]

Figure 1:
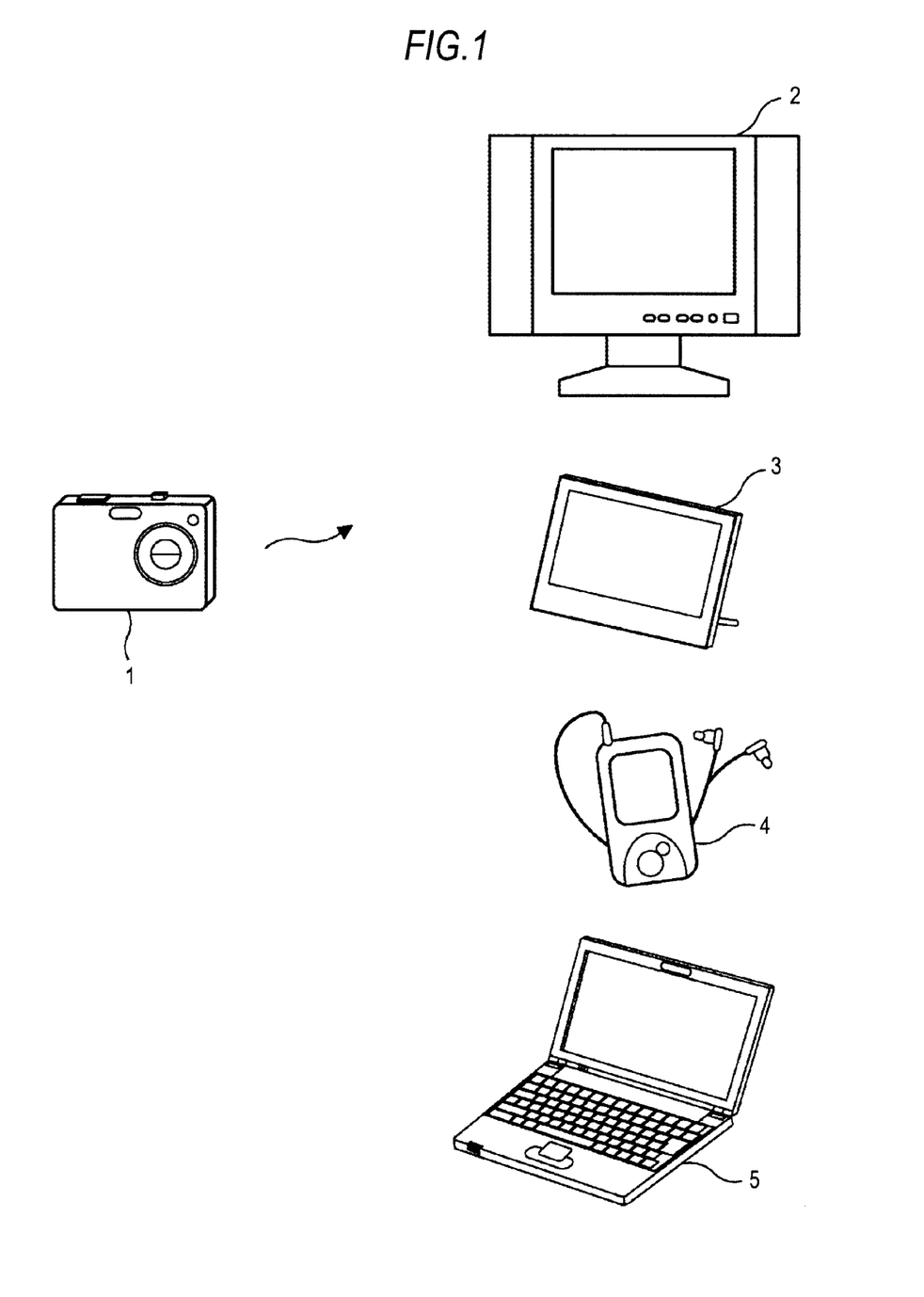
FIG. 1 is a view for explaining an outline of transmission processing of images for transmission.

FIG. 1 is a view for explaining an outline of transmission processing of images for transmission.

A digital still camera 1 images objects and store data of taken images of the objects in accordance with user operations. The digital still camera 1 is provided with a communication unit (a later-described communication unit 35 of FIG. 2) for performing communication with other apparatus, which is capable of transmitting stored taken images as images for transmission by performing mutual communication with a transmission destination apparatus by wireless communication.

As transmission destination apparatus, for example, apparatus having a communication function such as a television deceiver 2, a photo frame 3, a portable audio player 4 and a personal computer 5 can be cited as shown in FIG. 1. These apparatus have display units having different sizes respectively and can display taken images transmitted from the digital still camera 1 on the display units. The personal computer 5 includes a large-capacity recording device such as a hard disk, in which data of taken images transmitted from the digital still camera 1 can be stored.

Here, for example, when a taken image is stored in the recording device of the personal computer 5, or used for the purpose of being printed in a printing device (not shown), it is desirable that an original image (original data) having high resolution is transmitted in many cases.

On the other hand, for example, when the taken image is used for the purpose of being displayed and viewed by the display unit included in the television receiver 2, the photo frame 3 or the portable audio player 4, the resolution is sufficient to be, for example, approximately 2M-pixel or a VGA size in many cases.

That is, when the taken image is used for the purpose of being viewed, it is not necessary to transmit the original image (original data) having high resolution as the image for transmission to the transmission destination apparatus, and it is sufficient that an image for display (hereinafter referred to as a monitor display image) which is the same image (same content) as the original image having lower resolution than the original image is transmitted.

Accordingly, the digital still camera 1 shown in FIG. 1 transmits the monitor display image instead of the original image to apparatus which display taken images for the purpose of viewing such as the television receiver 2.

As these images are actually stored in files, a file storing the original image (original data) is referred to as an original file, and a file storing only monitor display image is referred to as a monitor display file in the following explanation. In other words, the monitor display file is a file storing only data corresponding to the monitor display image in the original image file. The monitor display image is an example of the image for transmission to be transmitted to the transmission destination apparatus (receiving device).

[Configuration Example of a Digital Still Camera]

Figure 2:
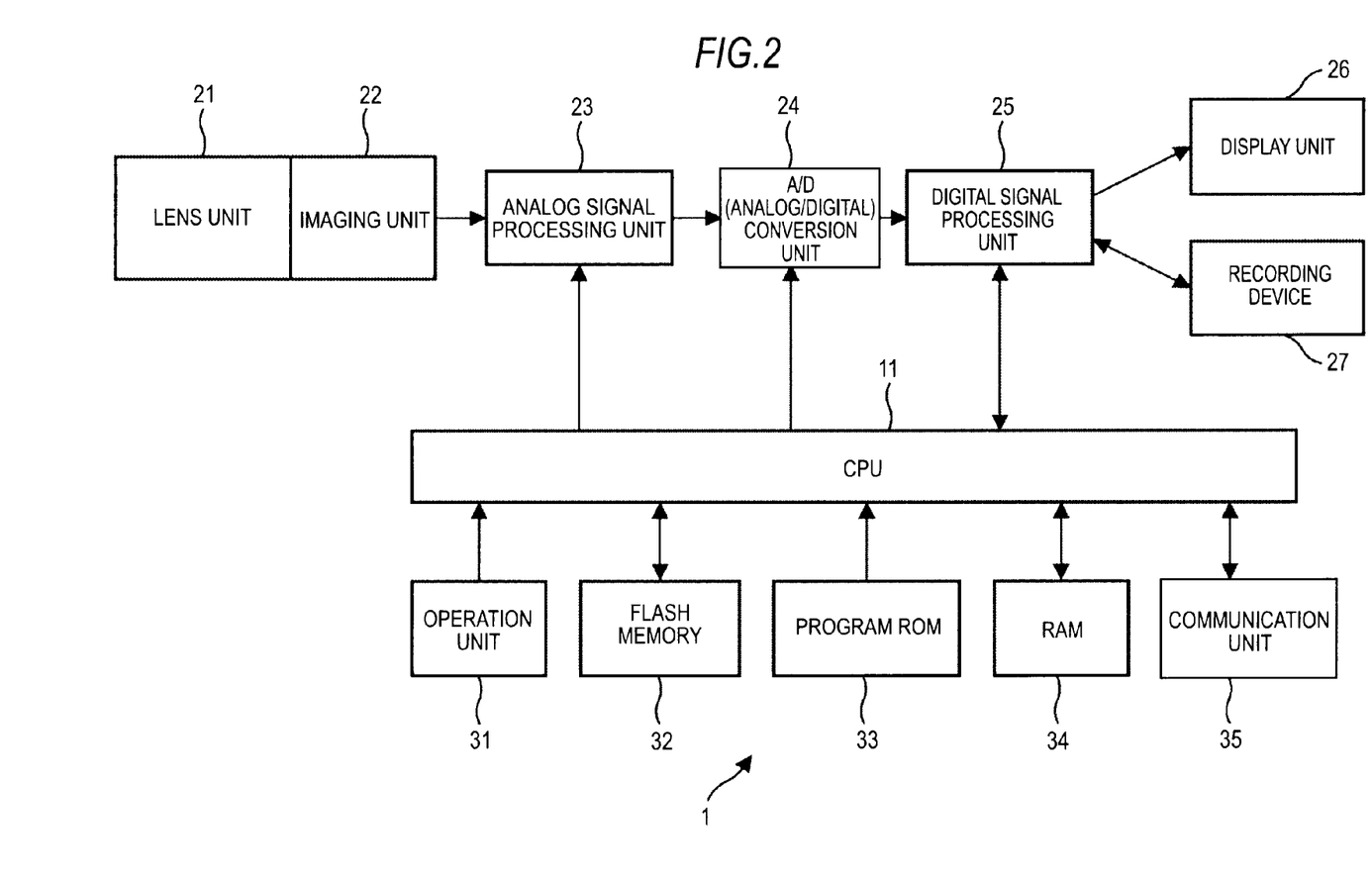
FIG. 2 is a view an internal configuration example of a digital still camera to which an embodiment of the invention is applied.

FIG. 2 is a view an internal configuration example of a digital still camera of FIG. 1.

The digital still camera 1 is configured by including a CPU (Central Processing Unit) 11, a lens unit 21, an imaging unit 22, an analog signal processing unit 23, an A/D (Analog/Digital) conversion unit 24, a digital signal processing unit 25, a display unit 26, a recording device 27, an operation unit 31, a flash memory 32, a program ROM (Read Only Memory) 33, a RAM (Random Access Memory) 34 and a communication unit 35.

The imaging unit 22 includes a CCD (Charge Coupled Device) or a CMOS (Complementary Metal Oxide Semiconductor) and so on, operating in accordance with a given timing signal to thereby receive light from an object incident through the lens unit 21 and perform photoelectric conversion to supply an analog image signal as an electric signal corresponding to the (light) receiving amount to an analog signal processing unit 23.

The analog signal processing unit 23 applies analog signal processing of, for example, amplifying the analog image signal from the imaging unit 22 in accordance with the control of the CPU 11, transmitting the image signal obtained as a result of the analog signal processing to the A/D conversion unit 24.

The A/D conversion unit 24 performs A/D conversion of the image signal which is the analog signal supplied from the analog signal processing unit 23 in accordance with the CPU 11, supplying image data indicated by a digital signal obtained as the result of the processing to the digital signal processing unit 25.

The digital signal processing unit 25 performs digital signal processing such as noise removal processing to the image data supplied from the A/D conversion unit 24 in accordance with the control of the CPU 11, supplying the data to the display unit 26 to be displayed thereon. The digital signal processing unit 25 also compresses the image data supplied from the A/D conversion unit 24 by using a JPEG (Joint Photographic Experts Group) system and the like, supplying the compressed image data obtained as a result of the compression to the recording device 27 to be recorded therein. Furthermore, the digital signal processing unit 25 expands compressed image data recorded in the recording device 27 and supplied the image data obtained as the result of expansion to the display unit 26 to be displayed thereon.

The recording device 27 is, for example, a removable recording medium such as a semiconductor memory, which can be attached and removed easily with respect to the digital camera 1.

The CPU 11 controls respective units included in the digital still camera 1 by executing a program recorded in the program ROM 33 and performs various processing in accordance with signals from the operation unit 31.

The operation unit 31 is operated by the user and supplies signals corresponding to the operations to the CPU 11.

The flash memory 32 stores data such as various information set in the digital still camera 1 in accordance with the control of the CPU 11, which is necessary to be held when the power of the digital still camera 1 is turned off.

The program ROM 33 stores a program executed by the CPU 11 (a later-described control program 101 of FIG. 3) and data necessary for executing the program by the CPU 11. The RAM 34 temporarily stores programs and data necessary for performing various processing by the CPU 11.

The communication unit 35 performing communication processing with other apparatus, for example, by wireless communication and the like is also connected to the CPU 11.

In the digital still camera 1 configured as the above, the imaging unit 22 receives light from the object incident through the lens unit 21 to perform photoelectric conversion and outputs an analog image signal obtained as a result of the processing. The analog image signals outputted by the imaging unit 22 are supplied to the digital signal processing unit 25 as image data of a digital signal through the analog signal processing unit 23 and the A/D conversion unit 24.

The digital signal processing unit 25 supplies image data from the A/D conversion unit 24 to the display unit 26, as a result, a so-called through-the-lens image is displayed in the display unit 26.

After that, when the user operates the operation unit 31 (shutter button), a signal corresponding to the operation is supplied to the operation unit 11 from the operation unit 31. When the signal corresponding to the operation is supplied from the operation unit 31, the CPU 11 controls the digital signal processing unit 25 to compress the image data supplied to the digital signal processing unit 25 from the A/D conversion unit 24 at that time and to record the compressed image data obtained as a result of the compression in the recording device 27. According to the processing, the taken image is stored in the recording device 27.

As described above, so-called image taking is performed.

The program executed by the CPU 11 is not only installed, namely, stored in the program ROM 33 in advance but also can be stored in the recording device 27, then, provided to the user as a packaged medium. Accordingly, the program can be stored in the flash memory 32 from the recording device 27 through the digital signal processing unit 25 and the CPU 11 to thereby be installed in the digital still camera 1. The program executed by the CPU 11 can be also downloaded directly to the digital still camera 1 of FIG. 2 from a download site, or downloaded by the personal computer 5 of FIG. 1 and the like, supplied to the digital still camera of FIG. 2 and stored in the flash memory 32 to thereby be installed in the digital still camera 1.

Figure 3:
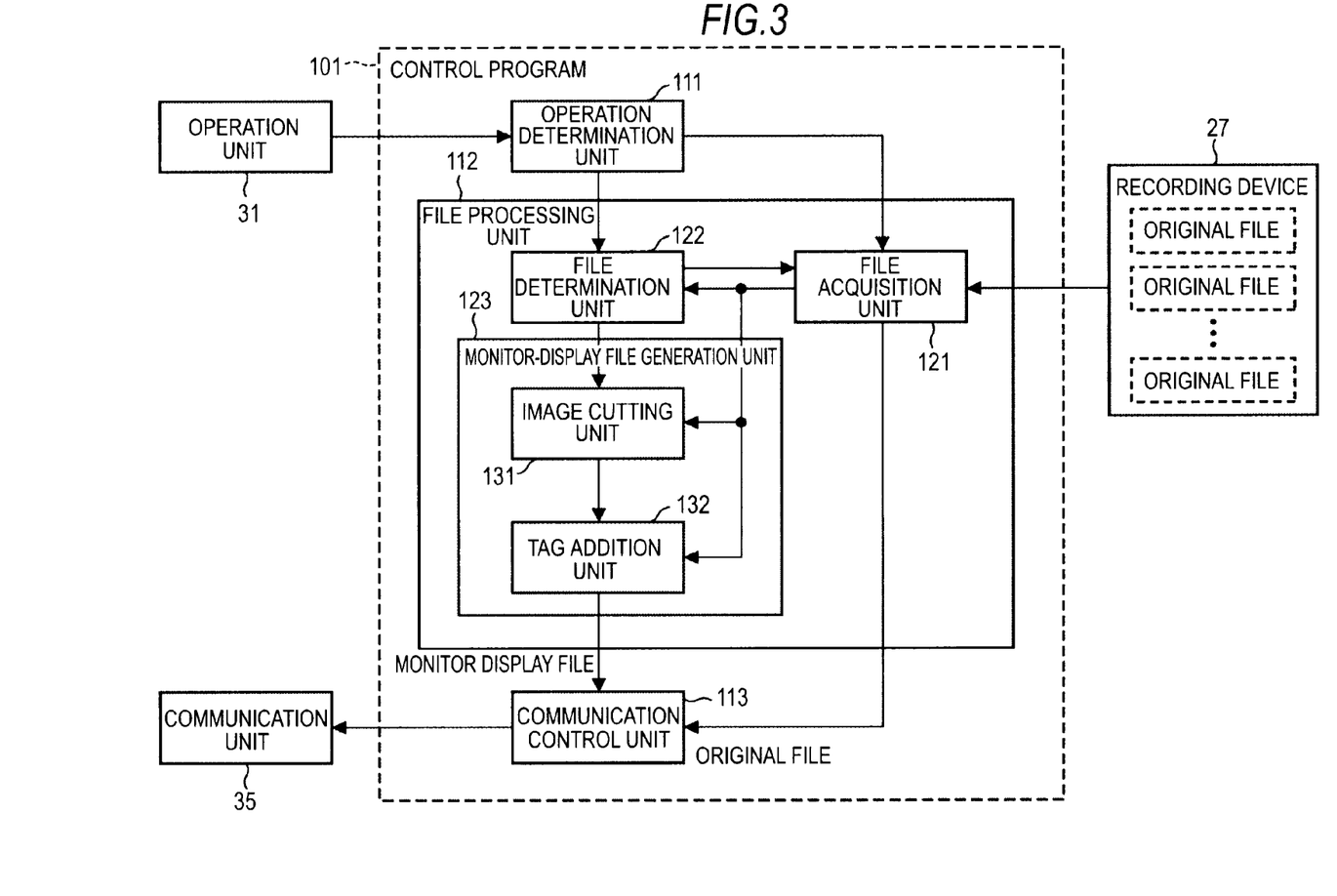
FIG. 3 is a block diagram showing an example of a functional configuration of the digital still camera.

The configuration of hardware in the digital still camera 1 is not limited to the example of FIG. 2, and it is sufficient that the configuration can at least realize a functional configuration of FIG. 3.

[Functional Configuration Example of the Digital Still Camera]

FIG. 3 is a block diagram showing an example of a functional configuration of a digital still camera 1 of FIG. 2.

In the embodiment, the digital still camera 1 has the above hardware configuration of FIG. 2, therefore, an operation determination unit 111, a file processing unit 112 and a communication control unit 113 are realized by the CPU 11 executing the control program 101, for example, recorded in the program ROM 33 as described above.

In FIG. 3, the same numerals are given to components which are the same as FIG. 2 and explanation concerning the same processing is omitted to avoid repeated explanation.

The operation determination unit 111 determines the operation content with respect to the operation unit 31 by the user based on the signal supplied from the operation unit 31 and supplies the determination result to the file processing unit 112.

The file determination unit 112 performs processing with respect to the file to be transmitted to the transmission destination apparatus such as the television receiver 2. The file processing unit 112 is configured by including a file acquisition unit 121, a file determination unit 122 and a monitor-display file generation unit 123.

The file acquisition unit 121 acquires the original file to be transmitted from original files recorded in the recording device 27 based on the determination result supplied from the operation determination unit 111 or the file determination unit 122. The file acquisition unit 121 supplies the acquired original file to the file determination unit 122, the monitor-display file generation unit 123 or the communication control unit 113.

The original file recorded in the recording device 27 stores the taken image, namely, the original image (original data) having high resolution. A data format of the taken image to be stored in the original file is not particularly limited, and for example, Bitmap, GIF (Graphic Interchange Format) or TIFF (Tagged Image File Format) and so on can be used in addition to JPEG. However, when original files are stored in the recording device 27, image data complying with an Exif (Exchangeable Image File Format) standard is stored in the DCF (Design rule for Camera File system) format as commonly performed in the digital camera and the like to thereby transmit the original file to the transmission destination apparatus complying with these standards to be displayed there.

The file determination unit 122 determines whether the monitor display image is stored in the original file or not based on attached information stored in the original file acquired by the file acquisition unit 121. The file determination unit 122 also determines whether the monitor display image stored in the original file has been selected by the user or not based on the determination result from the operation determination unit 111. The file determination unit 122 supplies the determination result to the file acquisition unit 121 or the monitor-display file generation unit 123.

To the monitor-display file generation unit 123, the original file is supplied from the file acquisition unit 121 and the determination result is supplied from the file determination unit 122. The monitor-display file generation unit 123 generates a monitor display file (file having resolution for display) having a data structure formed by storing the monitor display image stored in the original file and attribute information obtained by adding common attributes added to the original image with respect to unique attributes added to the monitor display image.

The monitor-display file generation unit 123 is configured by including an image cutting unit 131 and a tag addition unit 132.

The image cutting unit 131 cuts a given monitor display image corresponding to the determination result from the file determination unit 122 from one or plural monitor display images stored in the original file supplied from the file acquisition unit 121 and supplies the image to the tag addition unit 132.

To the tag addition unit 132, the monitor display image is supplied from the image cutting unit 131 and the original file is supplied from the file acquisition unit 121. The tag addition unit 132 adds common attributes of the original image stored in the original file to the unique attributes added to the monitor display image which has been cut by the image cutting unit 131.

The monitor display file generated by the monitor-display file generation unit 123 is supplied to the communication control unit 113.

To the communication control unit 113, the original file is supplied from the file acquisition unit 121 and the monitor display file is supplied from the monitor-display file generation unit 123. The communication control unit 113 controls the communication unit 35 to transmit the original file or the monitor display file to the transmission destination apparatus (for example, the television receiver 2 or the personal computer 5 of FIG. 1).

The digital still camera 1 is configured as described above.

[Application Example of a MP Format to a Baseline MP File]

Incidentally, a Multi Picture Format (MPF, hereinafter may be referred to as a MP format) standard is established by CIPA (Camera& Imaging Products Association) (refer to the following document).

"CIPA DC-007-2009, Multi Picture Format, establishment date; Feb. 4, 2009, created by standard development working group, multi-picture format sub-working group, issued by Camera & Imaging Products Association", Website of CIPA (searched at Feb. 12, 2010); Internet URL: http://www.cipa.jp/hyoujunka/kikaku/cipa-kikaku_list.html)

In the MPF standard, a Baseline MP file which can record monitor display images belonging to one main image (Baseline MP main image) having MPF attached information as a head image and an Extended MP file which can record plural main images corresponding to plural classes integrally are formulated.

The Baseline MP file is for defining MP format attached information and a file format for recording images having the size suitable for monitor display by being associated with the main image by using a compression image format of the Exif standard. The basic structure of the Baseline MP file has a data structure shown in FIG. 4A.

Figure 4A:
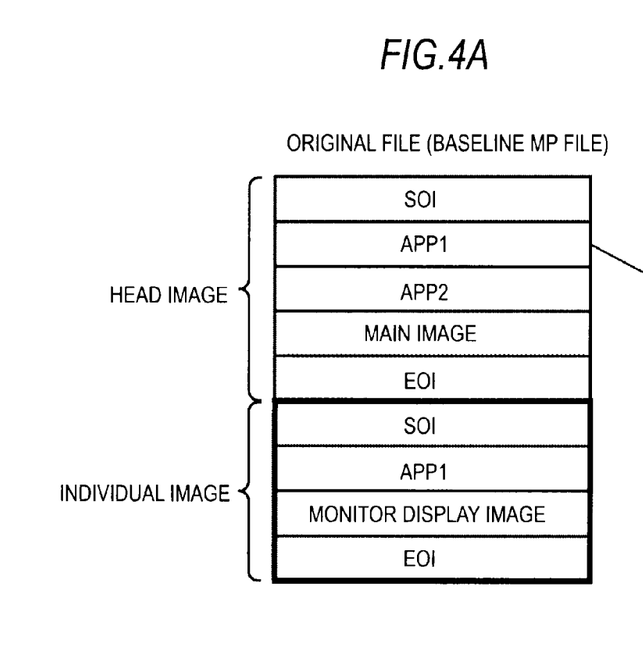
FIGS. 4A and 4B are views showing data structures of a Baseline MP file.

As shown in FIG. 4A, the Baseline MP file stores the head image and one or plural individual images. In the head image, APP1, APP2 and the main image are stored in respective regions between the start shown by SOI (Start Of Image) and the end shown by EOI (End Of Image). In APP1 positioned just after SOI, Exif attached information is stored. Subsequently, in APP2 positioned at a region after APP1, MP format attached information is stored.

"APPn" means an application marker segment region which is defined by a JPEG file format, and information unique to each application is stored in the region. That is, Exif attached information which is information unique to the Exif format is stored In the region of APP1 defined by JPEG and MP format attached information which is information unique to the MP format is stored in the region of APP2.

In the region after APP2 in which the MP format attached information is stored, the main image is stored. The main image is an image recorded as a principal image at the time of imaging, which corresponds to the original image (original data). That is, the Baseline MP file storing the main image corresponds to the above original file.

On the other hand, in the individual image, APP1 and the monitor display image are stored between SOI and EOI. The Exif attached information is stored in APP1, however, description of tags which are the same as the Exif tags in APP1 of the head image is prohibited in APP1 of the individual image (monitor display image), therefore, fundamental Exif tags are not included in APP1 of the individual image. The monitor display image is the image having the same field angle and the signal level as the main image, and further, the image is the same as the main image in the aspect ratio, orientation of the image and color space. That is, the monitor display image stored in the individual image corresponds to the monitor display image described as the above with reference to FIG. 1 and the like.

Figure 5:
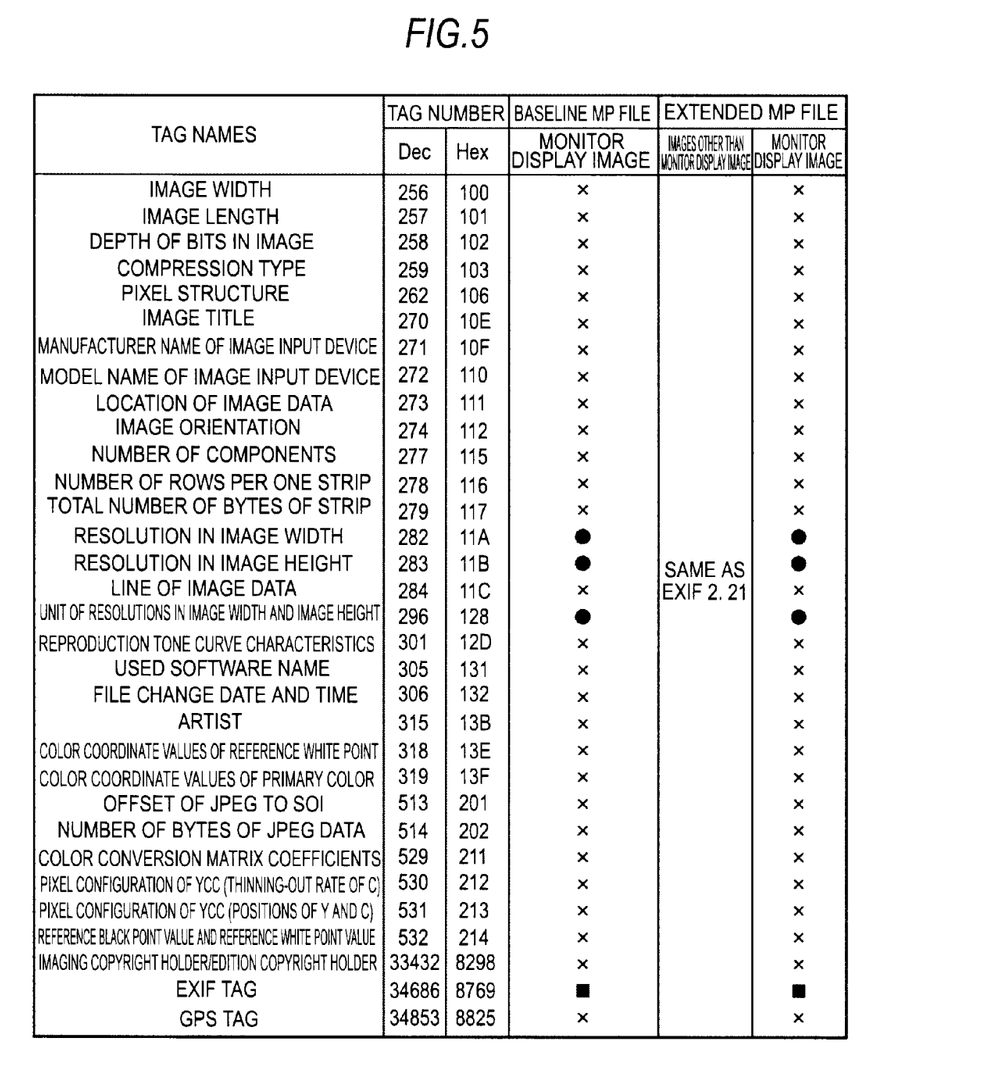
FIG. 5 is a chart showing description correspondence levels of Exif tags (attributes) of a monitor display image.

FIG. 5 is a chart showing description correspondence levels of Exif tags (attributes) of the monitor display image.

In the correspondence chart of FIG. 5, the presence of description of Exif tags in respective monitor display images in the Baseline MP file and the Extended MP file are shown so as to correspond to Exif tag names, in addition to tag numbers. Here, only the Baseline MP file is explained and the Extended MP file having a different file format from the Baseline MP file will be described later.

Concerning signs in the drawing, "x" indicates no description as the Exif tags of the monitor display image. "•" indicates the Exif tag which is fundamental when a value different from the main image (original image) is stored, and which is recommended not to be recorded when the value is the same. "■" indicates the Exif tag which will be fundamental when Exif Private Tag is recorded.

That is, resolution of the image width (XResolution), resolution of the image height (YResolution) and Unit of resolution of image width and height (ResolutionUnit) in which columns of the monitor display image are "•" in respective tag names are described in APP1 of the monitor display image when having the different value from the main image. Concerning these values, different values are set in the main image and the monitor display image in many cases, therefore, only Exif tags indicated by "•" are basically described in APP1 of the individual image (monitor display image).

On the other hand, the image width (ImageWidth), the image height (ImageLength) and so on in which columns of the monitor display image are "x" in respective tag names are described only in APP1 of the head image and are not described in APP1 of the individual image (monitor display image).

Figure 4B:
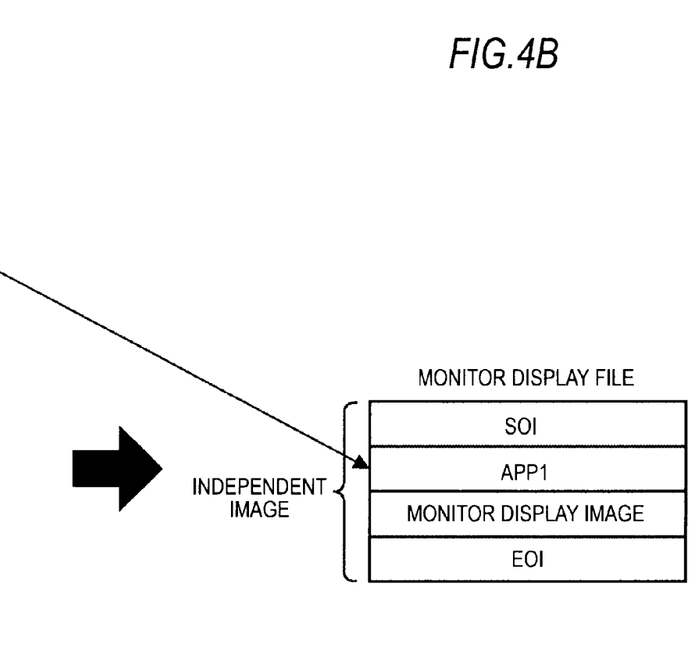

Accordingly, when only a portion of the individual image (monitor display image) is made to be independent from the Baseline MP file as shown in FIG. 4B, the Exif tags which are fundamental for displaying the monitor display image such as a pixel configuration of YCC (YCbCrPositioning) (tag number: 531) in FIG. 5 drop out. In this case, data will be incomplete as a single file, therefore, it is difficult to display the monitor display image in the transmission destination apparatus.

Accordingly, in the embodiment of the invention, the Exif tags which lack in APP1 of the individual image (monitor display image) are compensated by adding the Exif tags described in APP1 of the head image, thereby making APP1 of the monitor display image complete. Then, the monitor display file storing the monitor display image and APP1 to which the Exif tags are added is transmitted to the transmission destination apparatus, thereby displaying the monitor display image in the transmission destination apparatus based on the complete Exif tags described in APP1.

The monitor display image is recorded as a dependent image of the main image, and the maximum number of the monitor display images belonging to one main image is defined so that a class 1 has one image and a class 2 has one image.

Figure 6:
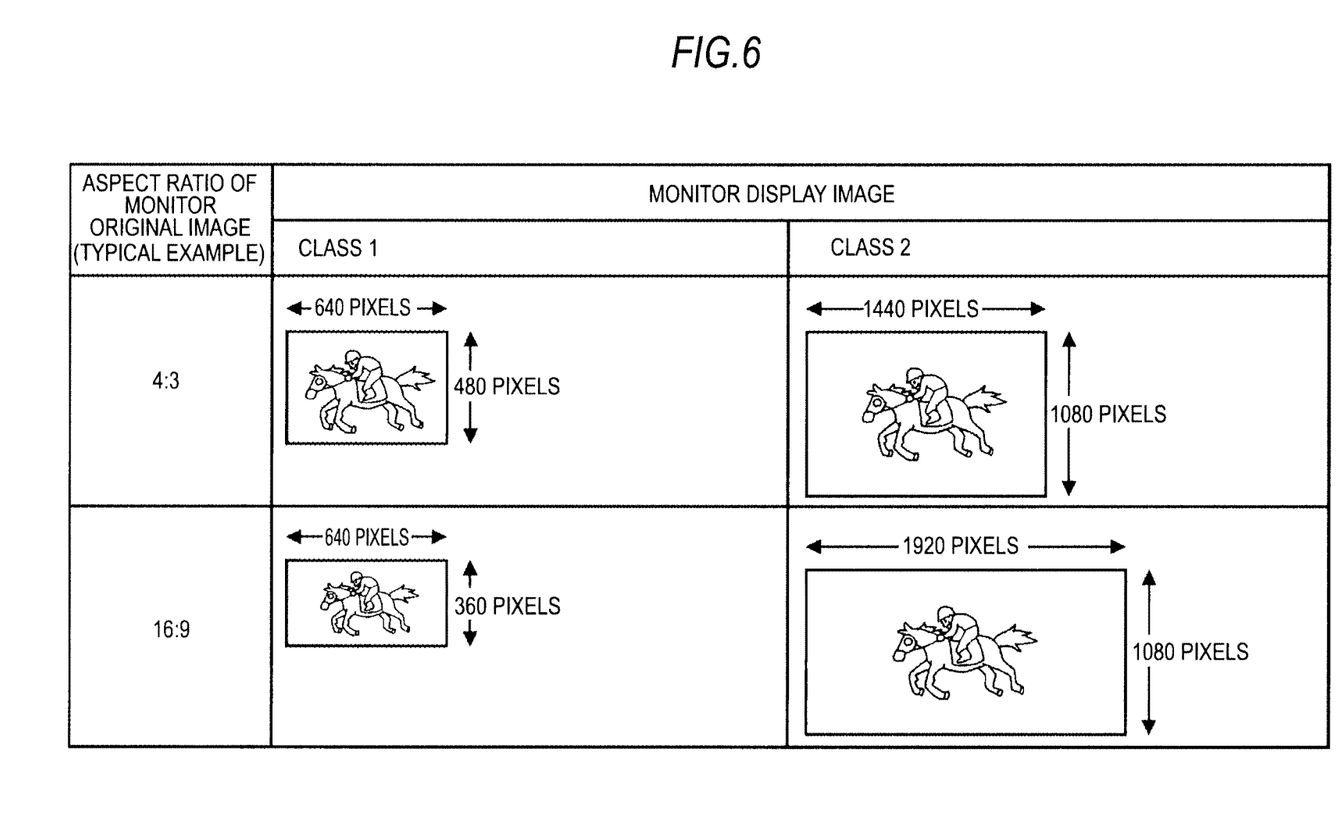
FIG. 6 is a view for explaining monitor display images in a class 1 and a class 2.

As shown in FIG. 6, in the class 1, any of the numbers of pixels in 640×480 pixels will be the upper limit of any of the numbers of pixels in horizontal and vertical directions, and in the class 2, any of the numbers of pixels in 1920×1080 pixels will be the upper limit of any of the numbers of pixels in horizontal and vertical directions. For example, when the aspect ratio is 4:3 in the class 1, the numbers of pixels will be 640×480 pixels, and when the aspect ratio is 16:9, the numbers of pixels will be 640×360 pixels. On the other hand, when the aspect ratio is 4:3 in class 2, the number of pixels will be 1440×1080 pixels, and when the aspect ratio is 16:9, the number of pixels will be 1920×1080.

As described above, it is possible to generate the monitor display file (shown in FIG. 4B) from the Baseline MP file (shown in FIG. 4A).

[Details of File Transmission Processing]

Next, transmission processing of the above-described original file (Baseline MP file) and the monitor display file will be explained with reference to a flowchart of FIG. 7.

Figure 7:
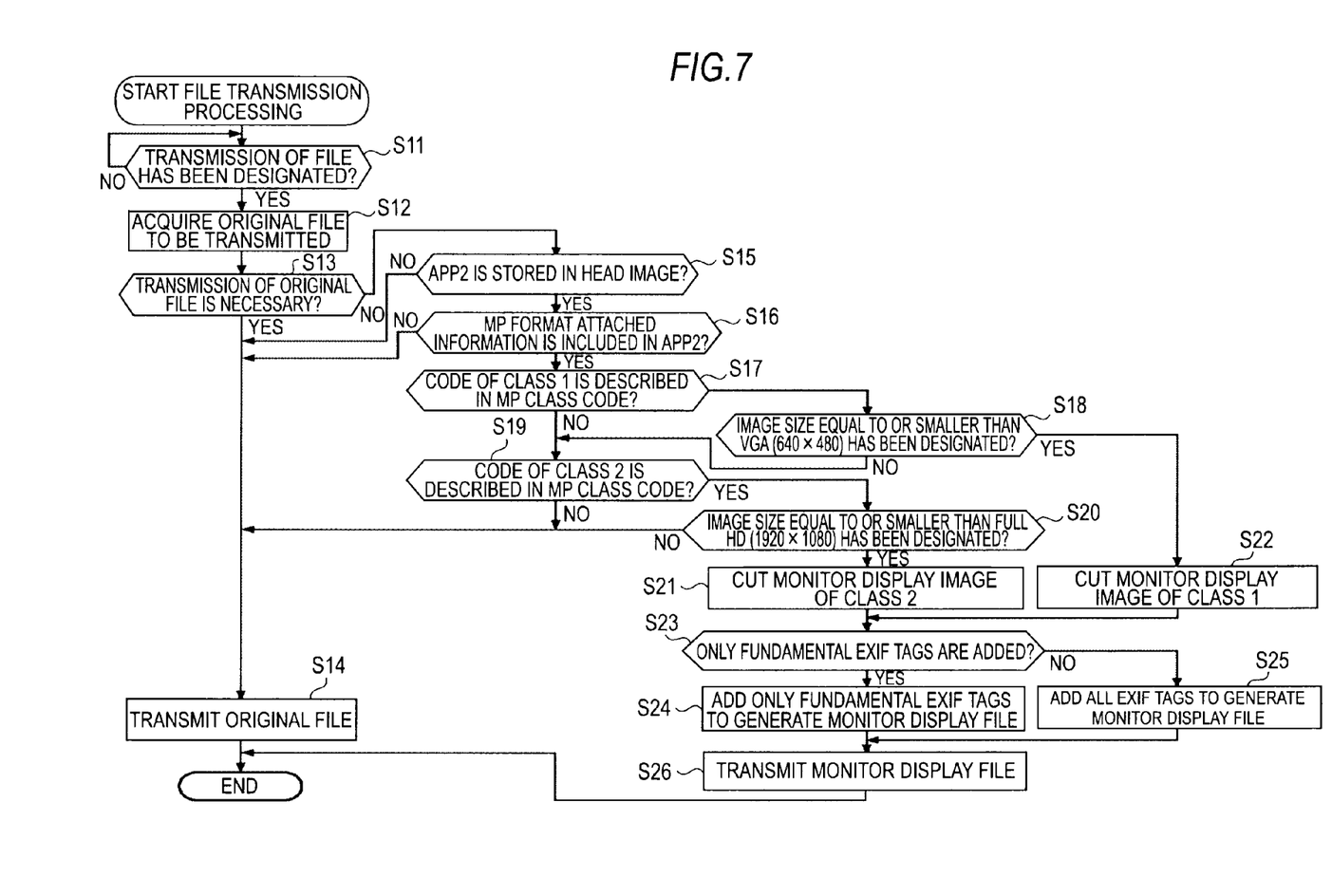
FIG. 7 is a flowchart for explaining file transmission processing.

Processing in respective steps of the flowchart of FIG. 7 is realized by the CPU 11 executing the control program 101.

The operation determination unit 111 determines whether transmission of a given file has been instructed or not by an operation of the operation unit 31 by the user in Step S11.

When it is determined that transmission of the file has been instructed in Step S11, the file acquisition unit 121 acquires the original file to be transmitted recorded in the recording device 27 in Step S12. In Step S13, the operation determination unit 111 determines whether it is necessary to transmit the original file or not. For example, when data of taken images imaged by the digital camera 1 is stored in the transmission destination apparatus such as the personal computer 5, it is necessary to transmit the original file ("Yes" in Step S13), therefore, the process proceeds to Step S14.

In Step S14, the communication control unit 113 controls the control unit 35 to transmit the original file acquired by the file acquisition unit 121 to the transmission destination apparatus. Accordingly, the original file storing the main image (original image) having high resolution recorded as a principal image at the time of imaging is stored in the transmission destination apparatus such as the personal computer 5.

On the other hand, when it is determined that it is not necessary to transmit the original file in Step S13, the file determination unit 122 determines whether APP2 is stored in the head image stored in the original file acquired by the file acquisition unit 121 or not.

When it is determined that APP2 is stored in the head image in Step S15, the file determination unit 122 determines whether MP format attached information is included in APP2 of the head image or not in Step S16. That is, when the MP format attached information which is information unique to the MP format is included in the region of APP2 of the head image, the original file to be transmitted is the file having the data structure of the MP format.

When it is determined that APP2 is not stored in the head image ("No" in Step S15), or when it is determined that MP format attached information is not included in APP2 of the head image ("No" in Step S16), the process proceeds to Step S14. In this case, the monitor display image is not included in the original file, therefore, the above processing of Step S14 is executed and the original file is transmitted to the transmission destination apparatus.

On the other hand, when it is determined that MP format attached information is included in APP2 of the head image in Step S16, the file determination unit 122 determines whether a code of the class 1 is described in a MP class code included in MP format attached information or not in Step S17.

The MP class is shown by individual image class management information included in a MP entry of a MP index IFD stored in the MP format attached information. For example, the class 1 of the monitor display image is indicated by a class code "010001" and the class 2 is indicated by a class code "010002". Accordingly, when "010001" is described as the class code, the monitor display image of the class 1 is included in the original file to be transmitted.

In Step S17, when it is determined that the monitor display image of the class 1 is included, the operation determination unit 111 determines whether the image size equal to or smaller than VGA (640×480 pixels) has been designated in accordance with the operation of the operation unit 31 by the user or not in Step S18. For example, when the monitor display image is displayed in apparatus having the small display unit such as the photo frame 3 or the portable audio player 4, the image size equal to or smaller than VGA is sufficient, therefore, the user designates the size by operating the operation unit 31.

It is preferable that information concerning the transmission destination apparatus which has displayed the monitor display image once is stored in the flash memory 32, thereby transmitting the monitor display image corresponding to the class which has been transmitted before not through the operation by the user when transmitting the file to the same apparatus next time. In this case, for example, an apparatus ID of the transmission destination apparatus and information of the class of the monitor display image transmitted before are stored by associating them with each other to thereby specify the class corresponding to the apparatus ID at the time of connecting to the transmission destination apparatus.

It is also preferable that information concerning the display unit is acquired from the transmission destination apparatus at the time of connection, and whether the monitor display image in the class 1 or the class 2 can be transmitted to the transmission destination apparatus or not may be determined based on the information of the display. Also in this case, the monitor display image in a given class is selected not through the operation by the user.

When it is determined that the image size equal to or smaller than VGA has been designated in Step S18, the image cutting unit 131 cuts the monitor display image of the class 1 stored in the original file acquired by the file acquisition unit 121 in Step S22.

The tag addition unit 132 determines whether only the fundamental Exif tags are added or not in Step S23. When the tag addition unit 132 adds only the fundamental Exif tags ("Yes" in Step S23), the tag addition unit 132 adds only fundamental Exif tags which are lacking to the monitor display file storing the cut monitor display image of the class 1 in Step S24.

For example, when the Exif tags such as the image width resolution in FIG. 5 (XResolution) ("•" in FIG. 5) are described as APP1 of the monitor display image as described above, the tag addition unit 132 adds particular Exif tags which are fundamental for displaying the monitor display image such as the pixel configuration of YCC (YCbCrPositioning) of FIG. 5. That is, the Exif tags indicated by "•" in FIG. 5 are added to the monitor display image as unique attributes, and Exif tags indicated by "x" in FIG. 5 added to the main image (original image) as common attributes are added to the unique attributes, thereby obtaining attribute information for displaying the monitor display image. At this time, the tag addition unit 132 adds only fundamental particular attributes (the pixel configuration of YCC (YCbCrPositioning) of FIG. 5 and the like) in attributes which are common between the main image (original image) and the monitor display image.

On the other hand, when all Exif tags are added ("No" in Step S23), the tag addition unit 132 adds all Exif tags in APP1 of the head image to the monitor display file storing the monitor display image of the class 1 which has been cut in Step S25.

For example, when the image width resolution (XResolution) of FIG. 5 ("•" in FIG. 5) and so on are described as APP1 of the monitor display image as described above, the tag addition unit 132 adds all Exif tags ("x" of FIG. 5) from the image width (Image Width) to a GPS tag (GPSInfo IFD Pointer) of FIG. 5. That is, the tag addition unit 132 adds not only fundamental particular attributes (pixel configuration of YCC (YCbCrPositioning) and so on in FIG. 5) but also all common attributes (all Exif tags indicated by "x" in FIG. 5) in attributes common between the main image (original image) and the monitor display image.

According to the above processing, the Exif tags lacking in APP1 of the individual image (monitor display image) stored in the Baseline MP file (FIG. 4A) are added, and the monitor display file (FIG. 4B) having the data structure storing APP1 (attribute information) and the monitor display image obtained by the processing is generated.

In Step S26, the communication control unit 113 controls the communication unit 35 to transmit the monitor display file generated by the monitor-display file generation unit 123 to the designated transmission destination apparatus such as the photo frame 3, the portable audio player 4 and so on.

When there does not exist the Exif tag lacking in the monitor display image, the processing of adding the Exif tag (processing of Step S23 or S25) is not performed and the monitor display image acquired by the image cutting unit 131 is transmitted in a form of a file without change. At this time, an error message may be displayed in the display unit 26.

When it is determined that the monitor display image of the class 1 is not included in Step S17 ("No" in Step S17), or when it is determined that the image size equal to or smaller than VGA (640×480 pixels) has not been designated in Step S18 ("No" in Step S18), the process proceeds to Step S19.

In Step S19, the file determination unit 122 determines whether the code of class 2 is described or not as the MP class code included in the MP format attached information.

The determination processing of the class 2 is executed based on the class code of the individual image class management information in the same manner as the determination processing of the class 1 (processing of Step S17). For example, when "010002" is described as the class code, the original file to be transmitted includes the monitor display image of class 2.

When it is determined that the monitor display image of the class 2 is included in Step S19, whether the image size equal to or smaller than full HD (full high definition) (1920×1080 pixels) has been designated or not in Step S20. For example, when the image for display is displayed on the television receiver 2, the image size equal to or smaller than the full HD is sufficient, therefore, the user designates the size by operating the operation unit 31.

When it is determined that the image size equal to or smaller than full HD has been designated in Step S20, the process proceeds to Step S21. In Step S21, the image cutting unit 131 cuts the monitor display image of the class 2 stored in the original file acquired by the file acquisition unit 121.

When the monitor display image of the class 2 is cut, fundamental Exif tags or all Exif tags are added to the monitor display file storing the cut monitor display image of the class 2 in the same manner as described above in Step S23 or Step S25. Accordingly, the monitor display file having the data structure storing APP1 obtained by adding the Exif tags and the monitor display image is generated. Then, the generated monitor display file is transmitted to the designated apparatus such as the television receiver 2 (processing of FIG. 26).

When it is determined that the monitor display image of the class 2 is not included ("No" in Step S19), or it is determined that the image size equal to or smaller than full HD is not designated ("No" in Step S20), the process proceeds to Step S14 because a monitor display image other than the monitor display images of the class 1 and the class 2 is not prepared in the embodiment. In this case, the above processing of Step S14 is executed and the original file is to be transmitted to the transmission destination apparatus. However, in the case where the monitor display image other than the class 1 and the class 2 (for example, a class 3 when expanded in the future) is stored in the original file, the same processing performed to the monitor display images of the class 1 and the class 2 as described above is performed with respect to the stored monitor display device.

As described above, when the monitor display image is transmitted to the transmission destination apparatus in the digital still camera 1, the monitor display device of a desired class is cut and the Exif tags lacking in the cut monitor display image are added to thereby generate the monitor display file.

That is, the monitor display file can be generated merely by performing simple processing of cutting the monitor display image and adding the Exif tags, therefore, the processing load at the time of transmitting the image for display can be reduced. Additionally, the monitor display file can be generated by simple processing, therefore, it is possible not only to reduce the processing load but also to shorten processing time at the time of transmitting the image for display. Furthermore, it is possible to reduce resources such as the memory capacity.

For example, the processing load at the time of transmitting the image for display can be reduced and processing time can be shortened as compared with the case in which ability information of the transmission destination apparatus is acquired or image data is transmitted after compressed for converting image resolution in related art. Additionally, the monitor display file having the data size smaller than the original file is transmitted, therefore, time for transmitting the file can be shortened as well as files can be stored in the transmission destination apparatus without preparing the large-capacity recording device.

It is also possible to transmit the monitor display image satisfying determination conditions whether the monitor display image of a desired class is stored in the original file or whether the monitor display image has the image size necessary for the transmission destination apparatus. As a result, the monitor display image of the minimum image size can be transmitted to the transmission destination apparatus without changing the image size.

Furthermore, concerning the monitor display file, image data complying with the Exif standard is stored in the DCF format in the digital still camera 1, thereby transmitting the monitor display file to the transmission destination apparatus which complies with these standards and displaying the image there. Accordingly, the user friendliness can be improved.

[Application Example of MP Format to Extended MP File]

The Baseline MP file including only the main image and the monitor display image has been explained in the above example, however, the Extended MP file defined by the MPF standard can be also applied. The Extended MP file is a file capable of integrally recording plural main images corresponding to types of a panorama image, a telescopic image and a multi-angle image. The Extended MP file can record images by allowing the monitor display image to belong to the main image in the same manner as the Baseline MP file.

The presence of description of Exif tags in the monitor display image is shown in the Extended MP file of the correspondence chart of FIG. 5 as in the above manner. The presence of Exif tags in images other than the monitor display image is described in the correspondence chart of the Extended MP file, which will comply with the Exif standard.

That is, in the Extended MP file, the image width resolution (XResolution) and so on in respective tag names in which columns of the monitor display image are "•" are described in APP1 of the individual image (monitor display image) when having the different value from the main image. On the other hand, the image width (ImageWidth) and so on in respective tag names in which columns of the monitor display image are "x" are described only in APP1 of the head image and are not described in APP1 of the individual image (monitor display image).

Also in the Extended MP file, the Exif tags which lack in APP1 of the individual image (monitor display image) are compensated by adding the Exif tags described in APP1 of the head image, thereby making APP1 of the monitor display image to be complete in the same manner as the Baseline MP file. Then, the monitor display file storing the monitor display image and APP1 to which the Exif tags are added is transmitted to the transmission destination apparatus, thereby displaying the monitor display image in the transmission destination apparatus based on the complete Exif tags described in APP1.

As described above, the monitor display file can be generated from the Extended MP file in the same manner as the Baseline MP file.

[Modification Example]

The monitor display image has been explained as an example of transmitting images for transmission as the above. The embodiment of the invention can be applied in the same manner also when using other images for transmission to be transmitted to the transmission destination apparatus (receiving apparatus) instead of the monitor display image. The case where the monitor display image complies with the MP format has been explained as an example, however, the embodiment of the invention can be also applied in the same manner also when the image complies with other standards as long as file formats have the data structure storing the original image, one or plural images for transmission different from the original image and attribute information concerning attributes of these images. For example, the embodiment of the invention can be applied to a RAW data file including reduced images.

In the above explanation, the digital still camera 1 and the transmission destination apparatus are perform communication with each other by wireless communication to thereby transmit the file, however, the file may be transmitted, for example, through wired communication as well as the file may be transmitted/received through recording media such as a memory card or a personal computer, in addition to the wireless communication. When the file is transmitted/received through recording media such as the memory card, it is not necessary to provide the communication unit 35 in the digital still camera 1.

As wireless communication, various communication systems such as wireless communication by TransferJet can be applied. Particularly, when high-speed transfer is performed in a short period of time such as in TransferJet, the time for transmitting the file can be further shortened by transmitting the monitor display file having the data size smaller than the original file.

The digital camera 1 has been explained as an example as the above, however, the embodiment of the invention can be applied to electronic apparatus having an imaging means such as a cellular phone device, a video camera, a PDA (Personal Digital Assistant), a game machine as well as electronic apparatus capable of transmitting files to the transmission destination apparatus such as a personal computer, an image scanner and a recorder.

In the specification, steps of describing the program stored in the recording medium includes not only processing performed in time series along the described order but also processing executed in parallel or individually even when not always executed in time series.

The embodiment of the invention is not limited to the above embodiment and can be variously modified within a scope not departing from the gist of the invention.

The present application contains subject matter related to that disclosed in Japanese Priority Patent Application JP 2010-079180 filed in the Japan Patent Office on Mar. 30, 2010, the entire contents of which is hereby incorporated by reference.

What is claimed is:
1. An image capturing device comprising:
circuitry configured to
  capture an image of an object,
  record an original image file onto a recording medium based on an image signal corresponding to the image of the object,
wherein the original image file includes
an original image,
an individual image different from the original image,
a first attribute section including first attribute information related to the original image and common attribute information which is common between the original image and the individual image, and
a second attribute section including second attribute information related to the individual image and not including the common attribute information,
the circuitry being further configured to
detect a file transmission instruction,
generate, in response to the detection of the file transmission instruction, a transmission file including the individual image and a third attribute section including the second attribute information stored in the second attribute section and the common attribute information extracted from the first attribute section, the common attribute information extracted from the first attribute section including at least pixel configuration information, the third attribute section not including the first attribute information stored in the first attribute section, and
transmit the generated transmission file to a receiving device,
wherein the circuitry is further configured to:
determine whether a resolution of the individual image corresponds to a display ability of a display based on the file transmission instruction, and
cut the individual image having the resolution corresponding to the display ability when it is determined that the resolution of the individual image corresponds to the display ability of the display.

2. The image capturing device according to claim 1, wherein the receiving device includes the display, the individual image included in the transmission file is to be displayed on the display.

3. The image capturing device according to claim 2, wherein the original image file further includes attached information for associating the original image with the individual image, and
  the circuitry cuts the individual image based on the attached information stored in the original image file.

4. The image capturing device according to claim 2, wherein the circuitry adds only fundamental attribute information for displaying the individual image from the first attribute section.

5. The image capturing device according to claim 2, wherein the circuitry adds all common attributes information from the first attribute section.

6. The image capturing device according to claim 2, wherein the original image file is a file defined by a multi picture format, and the first attribute information and the common attributes information are Exif tags defined by an Exif (Exchangeable Image File Format) standard.

7. The image capturing device according to claim 6, wherein the second attribute section includes resolution information indicating resolutions in width and height of the individual image and a unit of the resolutions.

8. A transmission method for an image capturing device, comprising:
capturing an image of an object;
recording an original image file onto a recording medium based on an image signal corresponding to the image of the object,
wherein the original image file includes
an original image,
an individual image different from the original image,
a first attribute section including first attribute information related to the original image and common attribute information which is common between the original image and the individual image, and
a second attribute section including second attribute information related to the individual image and not including the common attributes information,
the method further including
detecting a file transmission instruction,
generating, in response to the detection of the file transmission instruction, a transmission file including the individual image and a third attribute section including the second attribute information stored in the second attribute section and the common attributed information extracted from the first attribute section, the common attribute information extracted from the first attribute section including at least pixel configuration information, the third attribute section not including the first attribute information stored in the first attribute section, and
transmitting the generated transmission file to a receiving device,
wherein the method further includes:
determining whether a resolution of the individual image corresponds to a display ability of a display based on the file transmission instruction, and
cutting the individual image having the resolution corresponding to the display ability when it is determined that the resolution of the individual image corresponds to the display ability of the display.

9. A non-transitory computer-readable medium storing computer-readable instructions thereon, the computer-readable instructions when executed by a computer cause the computer to perform a method comprising:
capturing an image of an object;
recording an original image file onto a recording medium based on an image signal corresponding to the image of the object,
wherein the original image file includes
an original image,
an individual image different from the original image,
a first attribute section including first attribute information related to the original image and common attribute information which is common between the original image and the individual image, and
a second attribute section including second attribute information related to the individual image and not including the common attributes information,
the method further including
detecting a file transmission instruction,
generating, in response to the detection of the file transmission instruction, a transmission file including the individual image and a third attribute section including the second attribute information stored in the second attribute section and the common attributed information extracted from the first attribute section, the common attribute information extracted from the first attribute section including at least pixel configuration information, the third attribute section not including the first attribute information stored in the first attribute section, and
transmitting the generated transmission file to a receiving device,
wherein the method further includes:
determining whether a resolution of the individual image corresponds to a display ability of a display based on the file transmission instruction, and
cutting the individual image having the resolution corresponding to the display ability when it is determined that the resolution of the individual image corresponds to the display ability of the display.

10. The image capturing device according to claim 1, wherein
the original image file further includes
a first class code indicative of a display class of the individual image,
a second image different from the original image and the individual image, and
a second class code indicative of a display class of the second image different from a display class of the individual image.

11. The image capturing device according to claim 10, wherein the resolution of the second image is greater than the resolution of the individual image.

12. The image capture device according to claim 10, wherein a resolution of the original image is greater than a resolution of the individual image and greater than a resolution of the second image.

13. The image capturing device according to claim 10, wherein the circuitry cuts one of the individual image and the second image to generate the transmission file based on the first class code or the second class code.

14. The image capturing device according to claim 1, wherein the generated transmission file is transmitted to a receiving device by a wireless communication.

15. The image capturing device according to claim 10, wherein the circuitry determines whether to cut the individual image or the second image in the original file based on an identification of the receiving device.

16. The image capturing device according to claim 1, wherein the common attribute information includes at least particular information to display the individual image included in the transmission file.

* * * * *